US012614023B1

(12) United States Patent
Sorvillo et al.

(10) Patent No.: US 12,614,023 B1
(45) Date of Patent: Apr. 28, 2026

(54) DISTRIBUTED DOCUMENT MANAGEMENT

(71) Applicant: GRANT THORNTON ADVISORS LLC, Chicago, IL (US)

(72) Inventors: Obra Owen Sorvillo, Chicago, IL (US); Andreas H. J. Osvath, Chicago, IL (US)

(73) Assignee: GRANT THORNTON ADVISORS LLC, Chicago, IL (US)

( * ) Notice: Subject to any disclaimer, the term of this patent is extended or adjusted under 35 U.S.C. 154(b) by 0 days.

(21) Appl. No.: 18/097,650

(22) Filed: Jan. 17, 2023

(51) Int. Cl.
*G06F 40/18* (2020.01)

(52) U.S. Cl.
CPC .................................... *G06F 40/18* (2020.01)

(58) Field of Classification Search
CPC ...................................................... G06F 40/18
See application file for complete search history.

(56) References Cited

U.S. PATENT DOCUMENTS

| | | | | |
|---|---|---|---|---|
| 2007/0088691 A1* | 4/2007 | Dickerman | ............. | G06F 40/18 707/999.005 |
| 2008/0209444 A1* | 8/2008 | Garrett | .................... | G06F 40/18 719/320 |
| 2009/0319542 A1* | 12/2009 | Le Brazidec | .......... | G06F 40/18 |
| 2010/0211862 A1* | 8/2010 | Parish | .................. | G06F 16/957 707/E17.014 |
| 2023/0214586 A1* | 7/2023 | Hudock | ................ | G06F 40/186 715/212 |

OTHER PUBLICATIONS

Excel Consultant, "Should Your Organization Integrate Microsoft Excel and Microsoft SQL Server To Enhance Performance," Webpage, Jun. 9, 2017, retrieved from <https://www.excelconsultant.net/should-your-organization-integrate-microsoft-excel-and-sql-server/ > on Nov. 16, 2022), 17 pages.
Excelhints, "Should You Integrate Microsoft Excel With a Microsoft Database," Webpage, Jun. 9, 2017, retrieved from <http://excelhints.com/2017/06/09/should-you-integrate-microsoft-excel-with-microsofts-databases/> on Nov. 16, 2022, 4 pages.

* cited by examiner

*Primary Examiner* — Jennifer N Welch
*Assistant Examiner* — Amy P Hoang
(74) *Attorney, Agent, or Firm* — Faegre Drinker Biddle & Reath LLP

(57) ABSTRACT

A client device for managing a distributed document is described. The client device comprises a transfer processor configured to exchange content data with a database, a spreadsheet processor configured to execute a file-based spreadsheet application, and a target processor configured to monitor content locations within a user interface. The transfer processor is configured to receive first content data that includes pre-existing data for a spreadsheet displayed by the application. The target processor is configured to populate first content locations with the first content data according to the identified content locations and capture second content data that is not included in the pre-existing data using content locations identified by a content profile. The content profile identifies content locations for the spreadsheet as displaying static content or user-based content. The transfer processor is configured to store the second content data in the database.

18 Claims, 6 Drawing Sheets

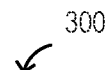

300

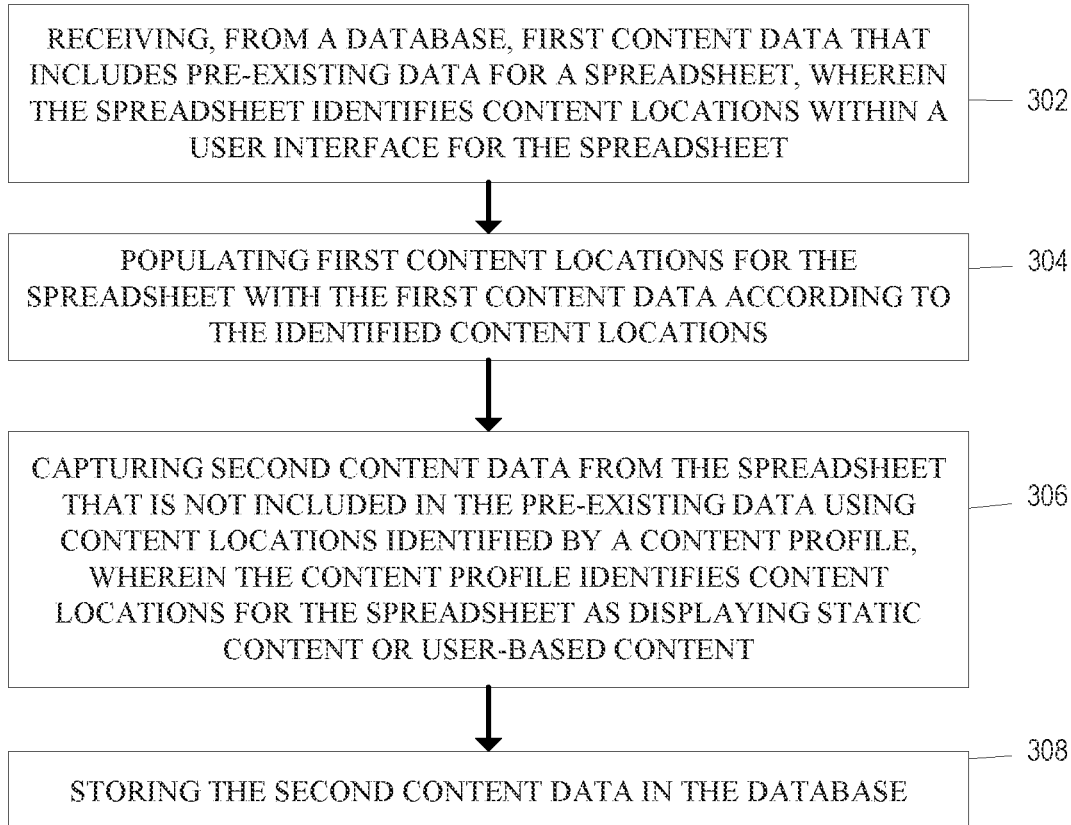

RECEIVING, FROM A DATABASE, FIRST CONTENT DATA THAT
INCLUDES PRE-EXISTING DATA FOR A SPREADSHEET, WHEREIN
THE SPREADSHEET IDENTIFIES CONTENT LOCATIONS WITHIN A
USER INTERFACE FOR THE SPREADSHEET                           — 302

POPULATING FIRST CONTENT LOCATIONS FOR THE              — 304
SPREADSHEET WITH THE FIRST CONTENT DATA ACCORDING TO
THE IDENTIFIED CONTENT LOCATIONS

CAPTURING SECOND CONTENT DATA FROM THE SPREADSHEET
THAT IS NOT INCLUDED IN THE PRE-EXISTING DATA USING    — 306
CONTENT LOCATIONS IDENTIFIED BY A CONTENT PROFILE,
WHEREIN THE CONTENT PROFILE IDENTIFIES CONTENT
LOCATIONS FOR THE SPREADSHEET AS DISPLAYING STATIC
CONTENT OR USER-BASED CONTENT

STORING THE SECOND CONTENT DATA IN THE DATABASE         — 308

Fig. 3

DISTRIBUTED DOCUMENT MANAGEMENT

BACKGROUND

Spreadsheet documents (e.g., Microsoft Excel, Google Sheets) are often used for storing and processing financial information and generation of reports. Much of the data may be re-used at a later time, such as when using quarterly reports to generate a yearly report. In some scenarios, spreadsheets are created as a template and then filled in with data for different reports. However, once data has been entered into the spreadsheet, re-use of the data requires a user to manually copy and paste data between spreadsheets or use another suitable file-to-file transfer. In some scenarios, the spreadsheets can be backed up into a storage system (e.g., a cloud-based or other suitable repository). Still, copying the data from the storage system into a new spreadsheet (e.g., copying from a quarterly report to a yearly report) requires a manual intervention by a user.

It is with respect to these and other general considerations that embodiments have been described. Also, although relatively specific problems have been discussed, it should be understood that the embodiments should not be limited to solving the specific problems identified in the background.

SUMMARY

Aspects of the present disclosure are directed to managing a distributed document.

In one aspect, a client device for managing a distributed document is provided. The client device comprises: a transfer processor configured to exchange content data with a database via a cloud data storage application programming interface; a spreadsheet processor configured to execute a file-based spreadsheet application on the client device; a target processor configured to monitor content locations for the file-based spreadsheet application. The transfer processor is configured to receive first content data that includes pre-existing data for a spreadsheet displayed by the file-based spreadsheet application, wherein the spreadsheet identifies the content locations within a user interface for the spreadsheet. The target processor is configured to populate first content locations for the spreadsheet with the first content data according to the identified content locations and capture second content data from the spreadsheet that is not included in the pre-existing data using content locations identified by a content profile, wherein the content profile identifies content locations for the spreadsheet as displaying static content or user-based content. The transfer processor is configured to store the second content data in the database via the cloud data storage application programming interface.

In another aspect, a method for managing a distributed document is provided. The method comprises receiving, from a database, first content data that includes pre-existing data for a spreadsheet, wherein the spreadsheet identifies content locations within a user interface for the spreadsheet. The method further comprises populating first content locations for the spreadsheet with the first content data according to the identified content locations. The method further comprises capturing second content data from the spreadsheet that is not included in the pre-existing data using content locations identified by a content profile, wherein the content profile identifies content locations for the spreadsheet as displaying static content or user-based content. The method further comprises storing the second content data in the database.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS/FIGURES

Non-limiting and non-exhaustive examples are described with reference to the following Figures.

FIG. 3 shows a flowchart of an example method of managing a distributed document, according to an example embodiment.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the present disclosure. Embodiments may be practiced as methods, systems, or devices. Accordingly, embodiments may take the form of a hardware implementation, an entirely software implementation, or an implementation combining software and hardware aspects. The following detailed description is therefore not to be taken in a limiting sense, and the scope of the present disclosure is defined by the appended claims and their equivalents.

The present disclosure describes various examples of a system for managing a distributed document. Although the description herein refers generally to spreadsheets implemented as distributed documents, other documents such as text or presentation documents may also be managed, in other embodiments and/or scenarios. Generally, the system maintains spreadsheets that would normally be opened and managed by a file-based spreadsheet application, such as Microsoft Excel or another suitable application. Although a typical spreadsheet stores both content data and non-content data or relationship data (e.g., relationships among the data, such as their location or cell within the spreadsheet), the system is configured to maintain the content data separately from the non-content data. In other words, text or values that would typically appear in a spreadsheet as displayed on a user interface are stored separately from data that defines where the content data should be displayed. Specifically, the content data is stored within a database (e.g., in one or more records of the database) while the spreadsheet itself is stored separately (e.g., in a separate record of the database, as a file in a file folder, etc.) without the content data being included within the spreadsheet. In some scenarios, the spreadsheet is also stored in the same database, but as a separate entry from the content data. In this way, security and redundancy of the content data is improved by using backup and redundancy features for databases (e.g., distributed database storage) instead of individual files on a single computing device. Advantageously, users may still use the file-based spreadsheet application when interacting with the content data, which reduces training time for the users.

Figure 1:
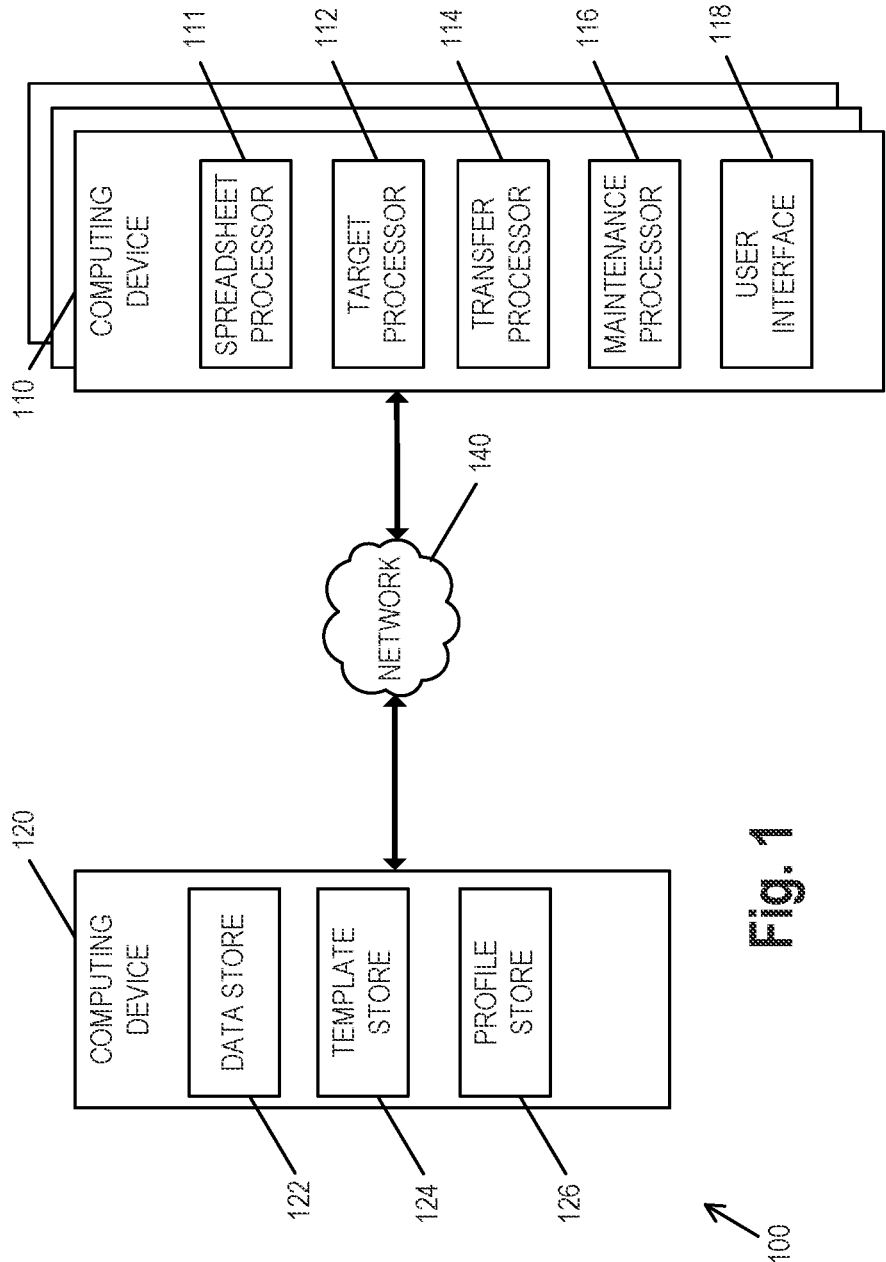
FIG. 1 shows a block diagram of an example of a system configuration in which a distributed document may be managed, according to an example embodiment.

This and many further embodiments for a computing device are described herein. For instance, FIG. 1 shows a block diagram of an example of a system 100 in which a spreadsheet may be managed, according to an example embodiment. As shown in FIG. 1, the system 100 includes a computing device 110 and a computing device 120. A network 140 communicatively couples the computing devices 110 and 120.

Computing device 110 may be any type of computing device, including a mobile computer or mobile computing device (e.g., a Microsoft® Surface® device, a laptop computer, a notebook computer, a tablet computer such as an Apple iPad™, a netbook, etc.), or a stationary computing device such as a desktop computer or PC (personal computer). In other embodiments, the computing device 110 is a cloud computing device or network server. Computing device 110 may be configured to execute one or more software applications (or "applications") and/or services and/or manage hardware resources (e.g., processors, memory, etc.), which may be utilized by users of the computing device 110.

Computing device 120 may be similar to the computing device 120, but may also include a network server or cloud computing device. However, in other embodiments, either of the computing device 110 or 120 may be implemented as any suitable type of computing device. Computing device 120 may be configured to execute one or more software applications (or "applications") and/or services and/or manage hardware resources (e.g., processors, memory, etc.), which may be utilized by users of the computing device 110.

Generally, the computing device 120 provides a service or platform for managing spreadsheets that are compatible with a file-based spreadsheet application, such as Microsoft Excel. The computing device 120 comprises a data store 122, a template store 124, and a profile store 126. In some examples, the data store 122 includes a database or other data storage module, such as Microsoft SQL server, Azure, MySQL, or other suitable database. In various embodiments, the computing device 120 provides an application programming interface (API) for interacting with the data store 122. The API may be specific to the database or a standalone API, in various embodiments. In some examples, the API is an Office.api or Excel.api reached using an Office.JS library.

The template store 124 and the profile store 126 may be implemented as a file storage system, database, or other suitable data repository. As described above, a spreadsheet may be divided or partitioned into separate components, specifically, into content data and non-content data of a distributed document. The content data may include text or strings, numbers, formulas, or other suitable data within a spreadsheet. In some scenarios, the content data may include images, charts, embedded data elements, or other suitable data. Non-content data may include relationship data (e.g., identifying relationships between cells or data elements or to other spreadsheets), layout data (e.g., identifying where content data should be located in a graphical user interface), metadata (e.g., a file name, author, editing timestamp, etc.), or other suitable data. Generally, the data store 122 is configured to store the content data for the spreadsheet, while a file for the spreadsheet itself is stored within the template store 124 (e.g., as a .xls or .xlsx file, referred to herein as a template). As explained above, templates may be spreadsheets (.xls or .xlsx files), text documents (.txt, .doc, .docx files), presentation documents (.ppt, .pptx) or other suitable file types. In some examples, the non-content data is stored in the spreadsheet, but some or all of the non-content data may be stored within the data store 122, in other examples.

Generally, the content data includes static content and user-based content. Static content includes content that generally does not change within the spreadsheet, such as column headers, row headers, table titles, etc. User-based content includes user-entered content, such as a value within a cell that a user enters in using a keyboard or other user interface, and user-dependent content, such as a value within a cell that is calculated based on user-entered content or simply displays user-entered content (e.g., where a value is user-entered in one location and displayed as "read-only" in several other locations).

The profile store 126 is configured to store content profiles that indicates which portions of a spreadsheet or template are static data and which portions of the spreadsheet are user-based content. Generally, content profiles facilitate locating, capturing, storing, and populating data for the spreadsheets. In some examples, a content profile includes identifiers for data and corresponding location information, such as cell coordinates (e.g., A4, D33), grid coordinates, table identifiers, or pixel coordinates for a user interface which may be used to capture data that has been entered by the user at the corresponding locations. In some examples, the location information includes object names or object identifiers for elements within a document object model (DOM) for a spreadsheet. In some examples, the content profile includes content information, such as a content type that may be used when saving user-entered data or populating user-entered data, or a use type that may indicate whether the content data is provided at a certain location (i.e., user-entered) or consumed at a certain location (i.e., user-dependent). Example content types may include strings, integers, floating point values, dates, timestamps, etc. In some examples, each template has a corresponding content profile, or even different content profiles for different versions of the template. In other examples, a content profile is shared among two or more templates. In one such example, a content profile is shared among templates of different types, for example, shared among a spreadsheet and a text document.

In some examples, data within a spreadsheet has a taxonomy that relates the content data to an external system, such as a financial reporting system. In some examples, the taxonomy is a dictionary of taxonomized data describing a hierarchy of data elements, with lower level data elements including evidentiary content (e.g., wages, dividends, etc.) that may be used to calculate a value for a higher level data element (e.g., adjusted gross income). Higher level data elements may be associated with taxonomy identifiers designating values with higher levels of importance. The content profile may include references to the external system to ensure that a desired naming convention is used for at least some of the content data within a spreadsheet. In this way, the content profile allows for content data within a spreadsheet to be readily exported to a report that is compatible with the external system. In other examples, the taxonomy is based on tagging of the content data with a client name, an entity name that is managed by the client, and a tax period during which the content data is applicable. For example, content data may have an identifier of ABC_Corp_EngineeringDept_2022_Q4_GrossIncome and the content profile may contain corresponding location information (e.g., cell coordinates, document names, etc.) where the content data should be displayed. In some examples, locations within a document that have not been explicitly referenced in the content profile as having content data are static content, while locations that have been referenced are user-based content.

Generally, one content profile identifies the user-based content for a single spreadsheet. In some examples, however, a single content profile identifies the user-based content for two or more spreadsheets, such as spreadsheets that contain links to one another or share data elements (e.g., one value for "gross income" is stored but the value appears in two or more locations or spreadsheets). In still other examples, a single content profile identifies the user-based content for a group of spreadsheets, such as within a file folder or other workspace.

The computing device 110 is generally a client device on which a user may interact with a spreadsheet. The computing device 110 comprises a spreadsheet processor 111, a target processor 112, a transfer processor 114, a maintenance processor 116, and a user interface 118. The user interface 118 may include any suitable user interface elements, such as a display, keyboard, touch-screen, mouse, trackpad, etc. and may be used to receive inputs from the user, including but not limited to selections of a spreadsheet and user-entered data. The spreadsheet processor 111 is configured to execute a file-based spreadsheet application, such as Microsoft Excel, and may be implemented, at least in part, as a central processor within a personal computer, for example.

The target processor 112 is configured to monitor content locations for the file-based spreadsheet application executing on the spreadsheet processor 111. For example, when the spreadsheet processor 111 runs the spreadsheet application and opens a spreadsheet, the target processor 112 monitors cells or other target locations (e.g., a header, footer, text box, chart, embedded data element) within the spreadsheet for updates made by the user. In some examples, the target processor 112 monitors, through JavaScript code, VisualBasic code, or other suitable code, the application events, such as Excel application events, Word application events, PowerPoint application events, or other suitable events that affect the content locations corresponding to the user-based content. For example, the target processor 112 may listen for, or be a handler for, an onCalculated event, an onChanged event, an onFormatChanged event, an onFormulaChanged event, a SheetChangeEvent, a SheetActivateEvent, a ButtonClickEvent, a PubSub Notification, or other suitable events for a cell or other object. In other examples, the target processor 112 checks for updates on a predetermined schedule, such as every two minutes, on an auto-save interval, or other suitable time.

Moreover, the target processor 112 is configured to populate content locations for the spreadsheet with content data received from the data store 122 according to content locations identified by the corresponding content profile from the profile store 126. The target processor 112 is also configured to capture content data from the spreadsheet using content locations identified by the content profile.

The transfer processor 114 generally transfers data between the data store 122 and the computing device 110 for use by one or more of the spreadsheet processor 111, the target processor 112, and the maintenance processor 116. More specifically, the transfer processor 114 is configured to exchange content data with a database (e.g., data store 122) via a cloud data storage application programming interface.

The transfer processor 114 may receive content data from the database (e.g., static content and user-based content) and also send content data to the database (e.g., user-entered content and user-dependent content). In some examples, the transfer processor 114 is configured to transfer content data directly between instances of a same spreadsheet. For example, a first user may have a first spreadsheet open on a first client device and a second user (or additional users) may have the first spreadsheet open on one or more second client devices. The transfer processor 114 may be configured to automatically send content data between the client devices, instead of transferring the content data first to the data store 122 and then back to the second content devices.

In some examples, the transfer processor 114 is configured to sanitize content data before sending the content data to be stored in the data store 122. For example, some text values may be incompatible with a database and require special characters (e.g., a backslash or asterisk) to be replaced with a compatible character or series of characters. In other examples, the transfer processor 114 performs other suitable operations before sending content data to the data store 122, such as concatenating cells or fields, removing whitespace, etc.

In some examples, the target processor 112 and/or the transfer processor 114 are implemented as add-ins, plug-ins, or other suitable software module for the file-based spreadsheet application. In this way, existing user interface features of the spreadsheet application are available to a user, while the data security and storage features from the data store 122 are facilitated by the target processor 112 and the transfer processor 114.

While the target processor 112 and the transfer processor 114 generally handle interactions with an open spreadsheet, the maintenance processor 116 is configured to perform maintenance tasks on a spreadsheet, including those spreadsheets that are not actively being used. The maintenance processor 116 is configured to modify the content data of a spreadsheet or structure of the templates. As one example, the maintenance processor 116 is configured to change a template to a newer version of a file format, such as changing from a .xls file to a .xlsx file. As another example, the maintenance processor 116 is configured to change display formatting of values, such as changing a cell from displaying its values in millions of USD to billions of Euros. In other examples, the maintenance processor 116 may edit a formula, cell values, table values, or range formatting, add or remove tables, add or remove worksheets, adjust visibility of rows, columns, or sheets, etc.

In some examples, the maintenance processor 116 is configured to generate content profiles for spreadsheets, for example, based on an existing taxonomy on which the spreadsheets were created. In this way, templates for spreadsheets that have previously been created, and possibly re-used by hundreds or thousands of spreadsheets, may be readily converted for use with the data store 122.

Figure 2:
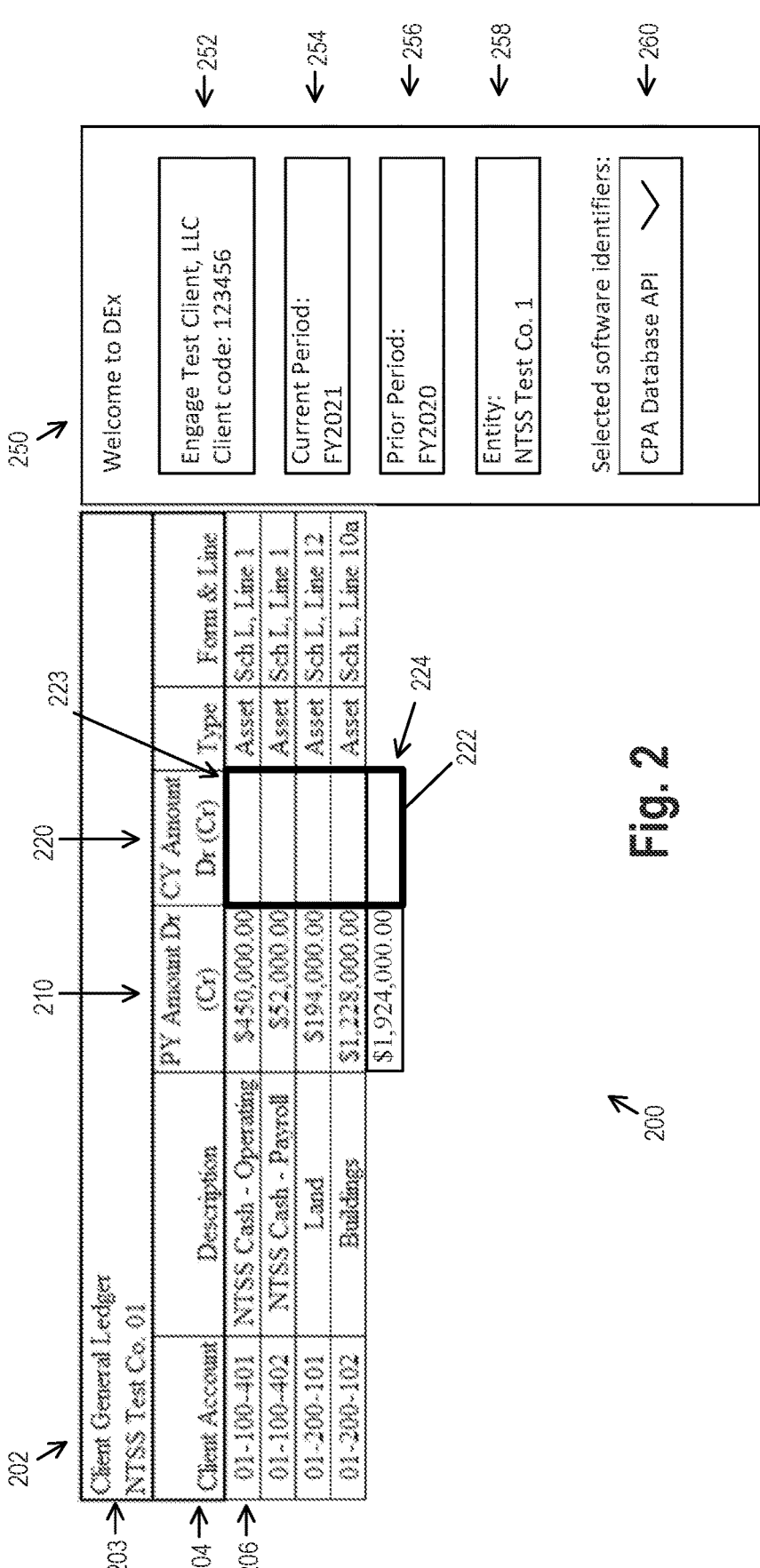
FIG. 2 shows a diagram of an example user interface for a spreadsheet, according to an example embodiment.

FIG. 2 shows a diagram of an example user interface 200 for a spreadsheet, according to an example embodiment. The user interface 200 displays a spreadsheet 202 and a plugin module 250. The plugin module 250 is a user interface component that generally corresponds to one or more of the target processor 112, the transfer processor 114, and/or the maintenance processor 116, in some examples. In other embodiments, the plugin module 250 is omitted, or simply hidden, from the user interface 200.

The spreadsheet 202 includes content data such as a table having a title 203, a row having column headers 204, and rows of data 206. Columns 210 and 220 of the spreadsheet

202 show a prior year amount (PY Amount Dr (Cr)) and a current year amount (CY Amount Dr (Cr)) for various accounts. However, as shown in FIG. 2, content data within the spreadsheet 202 may be divided or separate between static content and user-based content. Specifically, the column 220 includes empty cells 223 into which a user may enter values for the prior year amounts of accounts listed in the rows of data 206, and a cell 224 which may include a summation formula for the cells 223. The cells 223 may be referred to as user-entered content, the cell 224 may be referred to as user-dependent content (e.g., whose value is derived or based upon user-entered content), while other regions of the spreadsheet 202 may be static content.

The plugin module 250 includes drop-down selections for selecting a client 252, a current period 254, a prior period 256, an entity 258, and a software identifier 260. Generally, the client 252 and entity 258 may be used to select a particular business entity for the spreadsheet 202 and the current period and prior period 256 may be used to select a reporting period for the spreadsheet 202. In some examples, the transfer processor 114 uses these selections for generating a request to be transmitted to the data store 122 via the API. The software identifier 260 may be used to select an API with which to communicate with the data store 122, in some examples.

FIG. 3 shows a flowchart of an example method 300 of managing a distributed document, according to an example embodiment. Technical processes shown in these figures will be performed automatically unless otherwise indicated. In any given embodiment, some steps of a process may be repeated, perhaps with different parameters or data to operate on. Steps in an embodiment may also be performed in a different order than the top-to-bottom order that is laid out in FIG. 3. Steps may be performed serially, in a partially overlapping manner, or fully in parallel. Thus, the order in which steps of method 300 are performed may vary from one performance to the process of another performance of the process. Steps may also be omitted, combined, renamed, regrouped, be performed on one or more machines, or otherwise depart from the illustrated flow, provided that the process performed is operable and conforms to at least one claim. The steps of FIG. 3 may be performed by the computing device 110 (e.g., via the spreadsheet processor 111, the target processor 112, the transfer processor 114, the maintenance processor 116, or the user interface 118), or other suitable computing device.

Method 300 begins with step 302. At step 302, first content data that includes pre-existing data for a spreadsheet is received from a database. The spreadsheet identifies content locations within a user interface for the spreadsheet. In some examples, the spreadsheet corresponds to the spreadsheet 202, the user interface corresponds to the user interface 200, and the database corresponds to the data store 122. The pre-existing data includes previously stored data, such as a template or user-entered content, and may include pre-existing data which was previously entered by a user. In some examples, the pre-existing data is based on formulas contained within the spreadsheet that use values previously entered by the user.

At step 304, first content locations for the spreadsheet are populated with the first content data according to the identified content locations. The content locations may include cells (e.g., A3, B25, etc.), pixel coordinates, grid coordinates, table identifiers, or other suitable locations within a spreadsheet.

At step 306, second content data are captured from the spreadsheet using content locations identified by a content profile, where the second content data are not included in the pre-existing data. The content profile identifies content locations for the spreadsheet as displaying static content or user-based content. The second content data may include data entered by a user via the user interface 118, such as values for the empty cells in column 220 of FIG. 2. The content profile may be stored in the profile store 126, described above, and may include a list of cells, pixel coordinates, object names, object identifiers, or other suitable identifiers that indicate a location where user-entered content or user-based content may be entered. In some examples, capturing the second content data comprises receiving user-entered data via the user interface 200. In other examples, capturing the second content data comprises calculating user-dependent data based on the user-entered data.

At step 308, the second content data is stored in the database. For example, the transfer processor 114 may generate a request for storing the user-entered data in the data store 122 using a suitable API. In some examples, the API is selectable using the software identifier 260, described above.

In some examples, the method 300 further comprises monitoring content locations corresponding to user-based content according to the content profile for the second content data to be entered. For example, the target processor 112 may monitor application events that affect the content locations corresponding to the user-based content.

In some examples, step 302 comprises requesting the first content data via a cloud data storage application programming interface and step 308 comprises storing the second content data via the cloud data storage application programming interface.

In some examples, the method 300 further comprises receiving a spreadsheet identifier for the spreadsheet via the user interface of a file-based spreadsheet application. For example, a user may use Excel to open a spreadsheet where a file name of the spreadsheet is the spreadsheet identifier. The transfer processor 114 may generate a request for the first content data that includes the spreadsheet identifier, for example.

In some examples, the method 300 further comprises displaying the first content data within the user interface according to the spreadsheet and receiving the second content data based on a user interaction with the user interface, such as a text entry, paste action, execution of a macro or script, etc.

Figure 4:
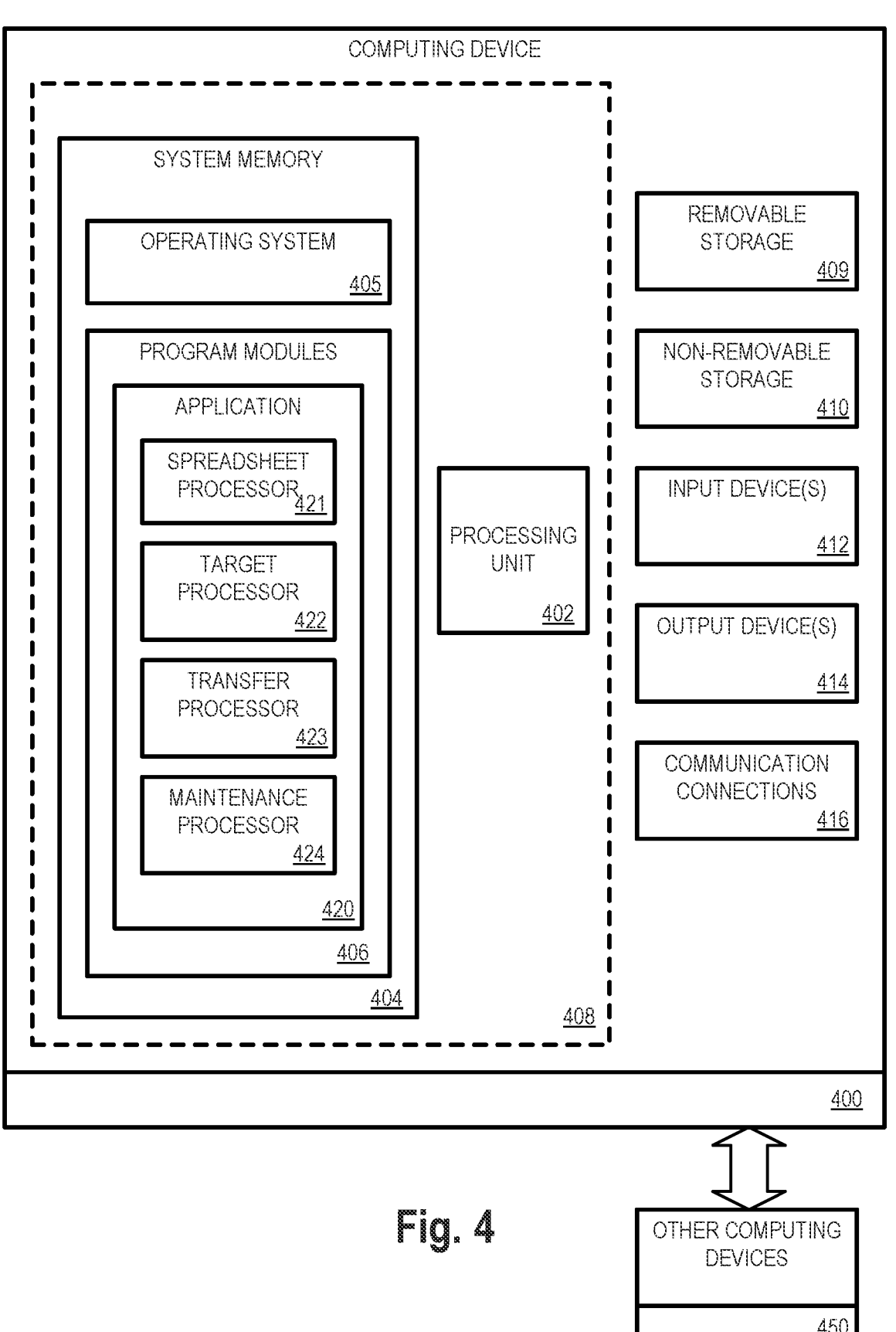
FIG. 4 is a block diagram illustrating example physical components of a computing device with which aspects of the disclosure may be practiced.
Figure 5:
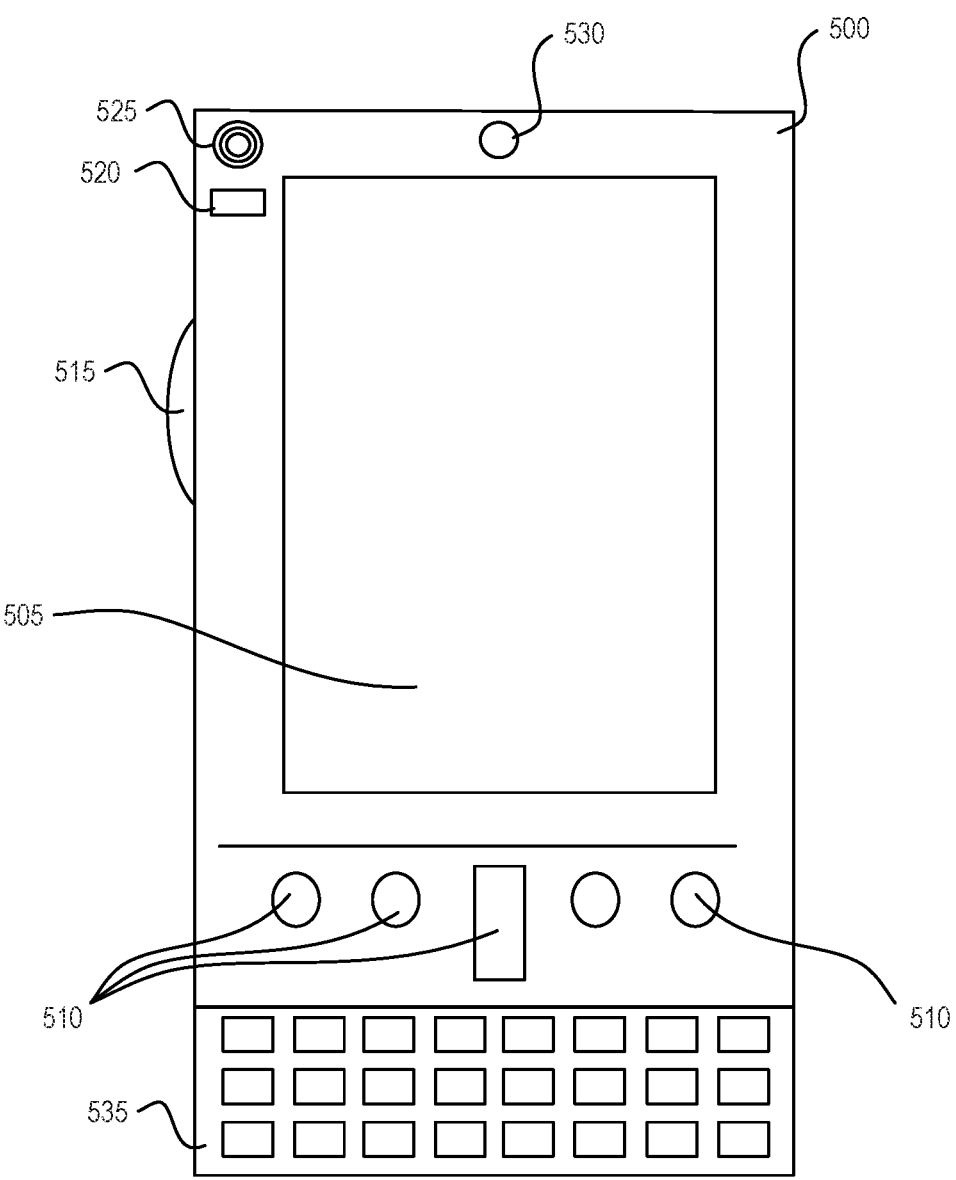
FIGS. 5 and 6 are simplified block diagrams of a mobile computing device with which aspects of the present disclosure may be practiced.
Figure 6:
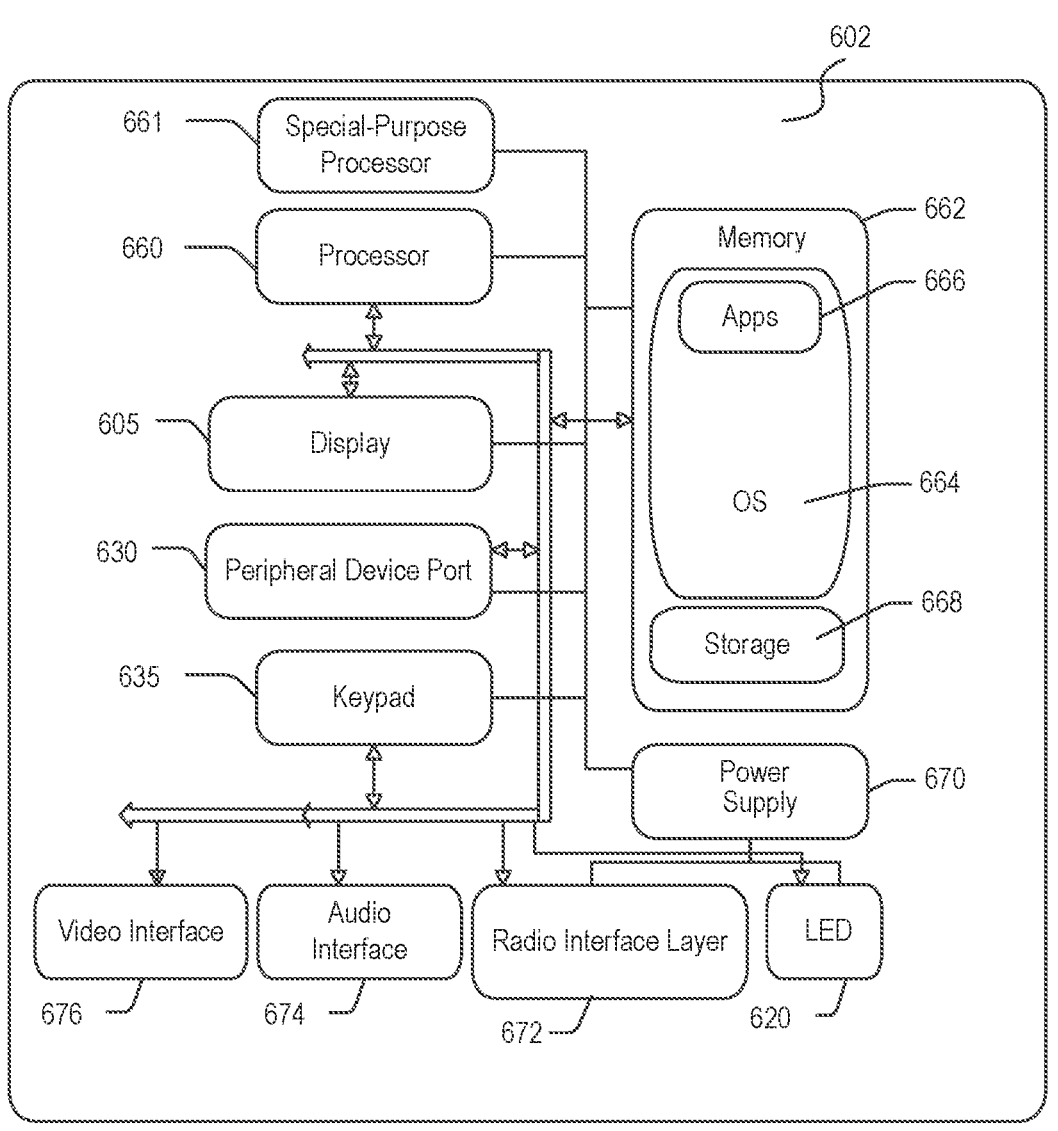

FIGS. 4, 5, and 6 and the associated descriptions provide a discussion of a variety of operating environments in which aspects of the disclosure may be practiced. However, the devices and systems illustrated and discussed with respect to FIGS. 4, 5, and 6 are for purposes of example and illustration and are not limiting of a vast number of computing device configurations that may be utilized for practicing aspects of the disclosure, as described herein.

FIG. 4 is a block diagram illustrating physical components (e.g., hardware) of a computing device 400 with which aspects of the disclosure may be practiced. The computing device components described below may have computer executable instructions for implementing a distributed document application 420 on a computing device (e.g., computing device 110, computing device 120), including computer executable instructions for distributed document application 420 that can be executed to implement the methods disclosed herein. In a basic configuration, the computing device 400 may include at least one processing unit 402 and a system memory 404. Depending on the configuration and type of computing device, the system memory 404 may comprise, but is not limited to, volatile storage (e.g., random access memory), non-volatile storage (e.g., read-only memory), flash memory, or any combination of such memories. The system memory 404 may include an operating system 405 and one or more program modules 406 suitable for running distributed document application 420, such as one or more components with regard to FIGS. 1 and 2 and, in particular, spreadsheet processor 421 (e.g., corresponding to spreadsheet processor 111), target processor 422 (e.g., corresponding to target processor 112), transfer processor 423 (e.g., corresponding to transfer processor 114), and maintenance processor 424 (e.g., corresponding to maintenance processor 116).

The operating system 405, for example, may be suitable for controlling the operation of the computing device 400. Furthermore, embodiments of the disclosure may be practiced in conjunction with a graphics library, other operating systems, or any other application program and is not limited to any particular application or system. This basic configuration is illustrated in FIG. 4 by those components within a dashed line 408. The computing device 400 may have additional features or functionality. For example, the computing device 400 may also include additional data storage devices (removable and/or non-removable) such as, for example, magnetic disks, optical disks, or tape. Such additional storage is illustrated in FIG. 4 by a removable storage device 409 and a non-removable storage device 410.

As stated above, a number of program modules and data files may be stored in the system memory 404. While executing on the processing unit 402, the program modules 406 (e.g., distributed document application 420) may perform processes including, but not limited to, the aspects, as described herein. Other program modules that may be used in accordance with aspects of the present disclosure, and in particular for managing a distributed document, may include spreadsheet processor 421, target processor 422, transfer processor 423, and maintenance processor 424.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 4 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 400 on the single integrated circuit (chip). Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

The computing device 400 may also have one or more input device(s) 412 such as a keyboard, a mouse, a pen, a sound or voice input device, a touch or swipe input device, etc. The output device(s) 414 such as a display, speakers, a printer, etc. may also be included. The aforementioned devices are examples and others may be used. The computing device 400 may include one or more communication connections 416 allowing communications with other computing devices 450. Examples of suitable communication connections 416 include, but are not limited to, radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 404, the removable storage device 409, and the non-removable storage device 410 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 400. Any such computer storage media may be part of the computing device 400. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

FIGS. 5 and 6 illustrate a mobile computing device 500, for example, a mobile telephone, a smart phone, wearable computer (such as a smart watch), a tablet computer, a laptop computer, and the like, with which embodiments of the disclosure may be practiced. In some aspects, the client may be a mobile computing device. With reference to FIG. 5, one aspect of a mobile computing device 500 for implementing the aspects is illustrated. In a basic configuration, the mobile computing device 500 is a handheld computer having both input elements and output elements. The mobile computing device 500 typically includes a display 505 and one or more input buttons 510 that allow the user to enter information into the mobile computing device 500. The display 505 of the mobile computing device 500 may also function as an input device (e.g., a touch screen display). If included, an optional side input element 515 allows further user input. The side input element 515 may be a rotary switch, a button, or any other type of manual input element. In alternative aspects, mobile computing device 500 may incorporate more or less input elements. For example, the display 505 may not be a touch screen in some embodiments. In yet another alternative embodiment, the mobile computing device 500 is a portable phone system, such as a cellular phone. The mobile computing device 500 may also include an optional keypad 535. Optional keypad 535 may be a physical keypad or a "soft" keypad generated on the touch screen display. In various embodiments, the output elements include the display 505 for showing a graphical user interface (GUI), a visual indicator 520 (e.g., a light emitting diode), and/or an audio transducer 525 (e.g., a speaker). In some aspects, the mobile computing device 500 incorporates a vibration transducer for providing the user with tactile feedback. In yet another aspect, the mobile computing device 500 incorporates input and/or output ports, such as an audio input (e.g., a microphone jack), an audio output (e.g., a headphone jack), and a video output (e.g., a HDMI port) for sending signals to or receiving signals from an external device.

FIG. 6 is a block diagram illustrating the architecture of one aspect of a mobile computing device. That is, the mobile computing device 500 can incorporate a system (e.g., an architecture) 602 to implement some aspects. In one embodiment, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666 may be loaded into the memory 662 and run on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as email or other messages used by an email application, and the like. A synchronization application (not shown) also resides on the system 602 and is programmed to interact with a corresponding synchronization application resident on a host computer to keep the information stored in the non-volatile storage area 668 synchronized with corresponding information stored at the host computer.

The system 602 has a power supply 670, which may be implemented as one or more batteries. The power supply 670 may further include an external power source, such as an AC adapter or a powered docking cradle that supplements or recharges the batteries.

The system 602 may also include a radio interface layer 672 that performs the function of transmitting and receiving radio frequency communications. The radio interface layer 672 facilitates wireless connectivity between the system 602 and the "outside world," via a communications carrier or service provider. Transmissions to and from the radio interface layer 672 are conducted under control of the operating system 664. In other words, communications received by the radio interface layer 672 may be disseminated to the application programs 666 via the operating system 664, and vice versa.

The visual indicator 620 may be used to provide visual notifications, and/or an audio interface 674 may be used for producing audible notifications via an audio transducer 525 (e.g., audio transducer 525 illustrated in FIG. 5). In the illustrated embodiment, the visual indicator 620 is a light emitting diode (LED) and the audio transducer 525 may be a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 525, the audio interface 674 may also be coupled to a microphone to receive audible input, such as to facilitate a telephone conversation. In accordance with embodiments of the present disclosure, the microphone may also serve as an audio sensor to facilitate control of notifications, as will be described below. The system 602 may further include a video interface 676 that enables an operation of peripheral device 630 (e.g., on-board camera) to record still images, video stream, and the like.

A mobile computing device 500 implementing the system 602 may have additional features or functionality. For example, the mobile computing device 500 may also include additional data storage devices (removable and/or non-removable) such as, magnetic disks, optical disks, or tape. Such additional storage is illustrated in FIG. 6 by the non-volatile storage area 668.

Data/information generated or captured by the mobile computing device 500 and stored via the system 602 may be stored locally on the mobile computing device 500, as described above, or the data may be stored on any number of storage media that may be accessed by the device via the radio interface layer 672 or via a wired connection between the mobile computing device 500 and a separate computing device associated with the mobile computing device 500, for example, a server computer in a distributed computing network, such as the Internet. As should be appreciated such data/information may be accessed via the mobile computing device 500 via the radio interface layer 672 or via a distributed computing network. Similarly, such data/information may be readily transferred between computing devices for storage and use according to well-known data/information transfer and storage means, including electronic mail and collaborative data/information sharing systems.

As should be appreciated, FIGS. 5 and 6 are described for purposes of illustrating the present methods and systems and is not intended to limit the disclosure to a particular sequence of steps or a particular combination of hardware or software components.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A client device for managing a distributed document, the client device comprising:

a transfer processor configured to exchange content data with a database via a cloud data storage application programming interface;

a spreadsheet processor configured to execute a file-based spreadsheet application on the client device;

a target processor configured to monitor content locations and detect application events affecting the content locations for user-based content of the file-based spreadsheet application;

wherein the transfer processor is configured to receive first content data that includes pre-existing data for a spreadsheet displayed by the file-based spreadsheet application, wherein the spreadsheet identifies the content locations within a user interface for the spreadsheet;

wherein the target processor is configured to populate first content locations for the spreadsheet with the first content data according to the identified content locations and capture second content data from the spreadsheet that is not included in the pre-existing data using content locations identified by a content profile, wherein the content profile includes identifiers for data and corresponding location information that is the user-based content at corresponding locations, wherein the target processor monitors content locations for the user-based content of the spreadsheet for user-based updates and changes in the spreadsheet, and wherein the content profile identifies content locations for the spreadsheet as displaying static content or user-based content wherein capturing the second content data comprises receiving user-entered data via the user interface, wherein capturing the second content data comprises calculating user-dependent data based on the user-entered data, and wherein the populating and capturing are performed automatically; and wherein the transfer processor is configured to store the second content data in the database via the cloud data storage application programming interface.

2. The client device of claim 1, wherein the target processor is configured to monitor content locations corresponding to user-based content according to the content profile for the second content data to be entered.

3. The client device of claim 2, wherein the transfer processor is configured to:

request the first content data from the database via the cloud data storage application programming interface; and store the second content data in the database via the cloud data storage application programming interface.

4. The client device of claim 1, wherein the target processor is configured to receive user-entered data via the user interface.

5. The client device of claim 4, wherein the spreadsheet processor is configured to calculate user-dependent data based on the user-entered data.

6. The client device of claim 1, wherein:

the spreadsheet processor is configured to receive a spreadsheet identifier for the spreadsheet via the user interface; and the transfer processor is configured to generate a request for the first content data that includes the spreadsheet identifier.

7. The client device of claim 1, wherein the pre-existing data was previously entered by a user.

8. The client device of claim 1, wherein the pre-existing data is based on formulas contained within the spreadsheet that use values previously entered by the user.

9. The client device of claim 1, wherein the spreadsheet processor is configured to:

display the first content data within the user interface according to the spreadsheet; and receive the second content data based on a user interaction with the user interface.

10. A method for managing a distributed document, the method comprising:

receiving, from a database, first content data that includes pre-existing data for a spreadsheet, wherein the spreadsheet identifies content locations within a user interface for the spreadsheet;

populating first content locations for the spreadsheet with the first content data according to the identified content locations;

detecting application events affecting the content locations for user-based content;

capturing second content data from the spreadsheet that is not included in the pre-existing data using content locations identified by a content profile, wherein the capturing of the second content data is triggered by the detected application events, wherein the content profile includes identifiers for data and corresponding location information that is the user-based content at corresponding locations, wherein the target processor monitors content locations for the user-based content of the spreadsheet for user-based updates and changes in the spreadsheet, and wherein the content profile identifies content locations for the spreadsheet as displaying static content or user-based content; and storing the second content data in the database wherein capturing the second content data comprises receiving user-entered data via the user interface, wherein capturing the second content data comprises calculating user-dependent data based on the user-entered data, and wherein the populating and capturing are performed automatically.

11. The method of claim 10, further comprising monitoring content locations corresponding to user-based content according to the content profile for the second content data to be entered.

12. The method of claim 11, wherein:

receiving the first content data comprises requesting the first content data via a cloud data storage application programming interface; and storing the second content data comprises storing the second content data via the cloud data storage application programming interface.

13. The method of claim 10, wherein capturing the second content data comprises receiving user-entered data via the user interface.

14. The method of claim 13, wherein capturing the second content data further comprises calculating user-dependent data based on the user-entered data.

15. The method of claim 10, the method further comprising:

receiving a spreadsheet identifier for the spreadsheet via the user interface of a file-based spreadsheet application; and generating a request for the first content data that includes the spreadsheet identifier.

16. The method of claim 10, wherein the pre-existing data was previously entered by a user.

17. The method of claim 10, wherein the pre-existing data is based on formulas contained within the spreadsheet that use values previously entered by the user.

18. The method of claim 10, wherein the method further comprises:

displaying the first content data within the user interface according to the spreadsheet; and receiving the second content data based on a user interaction with the user interface.

* * * * *